Patented Oct. 16, 1945

2,386,852

UNITED STATES PATENT OFFICE 2,386,852

SULPHONAMIDES AND PROCESS OF MAKING SAME

Max Hartmann, Riehen, Franz Cueni, Basel, Jean Druey, Riehen, and Harald von Meyenburg, Basel, Switzerland, assignors to Ciba Pharmaceutical Products, Incorporated, Summit, N. J., a corporation of New Jersey No Drawing. Application July 28, 1942, Serial No. 452,646. In Switzerland March 5, 1942

13 Claims. (Cl. 260—239.6)

It has been found that sulphonamides can be obtained by allowing heterocyclic amino compounds to react with aminothiazoles, aminothiodiazoles or aminopyrimidines containing two sulphonic acid radicals in which the sulphonic acid radical reacting with the amino compound consists of a benzene sulphonic acid radical which contains in the p-position an amino group or a substituent capable of conversion into an amino group and in which the other sulphonic acid radical is a non-aromatic sulphonic acid radical. The substituent capable of conversion into an amino group contained in the benzene sulphonic acid radical may be converted into an amino group.

As starting products may be used, for example, 2-aminothiazoles, 2-aminothiodiazoles or 2- or 4- (or -6-) aminopyrimidines containing two sulphonic acid radicals in which the sulphonic acid radical reacting with the amino compound is a benzene sulphonic acid radical, which contains in the p-position an amino group or a substituent capable of conversion into an amino group, e. g. an acylamino, nitro or azo group or a halogen atom, and in which the other sulphonic acid radical is the radical of a non-aromatic, i. e. an aliphatic, araliphatic, alicyclic or heterocyclic sulphonic acid. It is particularly expedient to start from compounds in which the non-aromatic sulphonic acid radical contains no basic group or no substituent convertible into a basic group in the event of the substituent capable of conversion into an amino group contained in the benzene sulphonic acid radical being converted into an amino group. As examples may be mentioned methyl, ethyl and benzyl sulphonic acid, etc. An acylamino group may be present, however, in the benzene sulphonic acid radical and a nitro group in the non-aromatic sulphonic acid radical. For the preparation of aminothiazoles, aminothiodiazoles and aminopyrimidines containing two sulphonic acid radicals, a non-aromatic sulphonic halide, e. g. ethyl or benzyl sulphonylchloride is made to react with, for example, a 2-aminothiazole, 2-aminothiodiazole or a 2-[or 4-]-aminopyrimidine, preferably in the presence of pyridine. In this way a sulphonamidothiazole, sulphonamidothiodiazole, or sulphonamidopyrimidine is obtained, which may be purified by dissolving in alkali. The monosulphonamides obtained are then treated with a p-substituted benzene sulphonyl halide, working either in water or in an inert organic solvent, e. g. acetone, in the presence of alkali or, for the preparation of the pyrimidine compounds, in the presence of pyridine.

Heterocyclic amines are used for the reaction, in particular aminopyridines, aminothiazoles, aminothiodiazoles, aminopyrimidines and aminopyrazines, e. g. 2-amino-pyridine, 2-aminothiazole, 2-amino-4-methylthiazole, 2-amino-4:5-dihydrothiazole, 2-amino-4-oxo-5-ethyl-4:5-dihydrothiazole, 2-amino-5-methyl-thiodiazole, 2-amino-5-ethylthiodiazole, 2-aminopyrimidine, 2-amino - 4 - methyl - pyrimidine, 2-amino-4:6-dimethylpyrimidine, 6-amino-2:4-dimethyl-pyrimidine, 2-amino-pyrazine.

The reaction should be carried out in an organic solvent, preferably in pyridine or quinoline, at a high temperature. The sulphonamides obtained from the reaction are separated by the usual methods. The one can be separated from the other, for example, after the preparation of the amino group by dissolving in acids. They may also be separated by utilizing their different solubility.

The products obtained by this process find a use as medicaments or as intermediate products in the preparation of such.

*Example 1*

25 parts of 2-benzylsulphonamido-thiazole, (M. Pt. 175° C.), obtained by the condensation of 2-amino-thiazole with benzylsulphonyl chloride in the presence of pyridine, are made to react with 25 parts p-acetylaminobenzene-sulphonyl chloride in a medium of water and acetone in the presence of alkalis, e. g. caustic soda or sodium carbonate. The product of the reaction, 2-[benzylsulphonimido]-3-[p-acetylaminobenzenesulphonyl]-thiazoline of formula I below is sucked off, purified by washing with dilute caustic soda and water, and then dried. It melts, after recrystallization from 50% acetic acid at 162° C. 45 parts of the compound so obtained are heated on a water bath for 3 hours in a mixture of 70 parts pyridine and 10 parts aminothiazole. The pyridine is distilled off in vacuo and the residue heated to boiling for two hours with dilute caustic soda. After cooling, it is filtered, if necessary in the presence of charcoal, and hydrochloric acid added to the filtrate until it gives an acid reaction to Congo. The 2-benzylsulphonamidothiazole of Formula III, which was used as starting product, separates out. It can be re-dissolved in 50% acetic acid and recovered in the pure form (M. Pt. 175° C.) with a very good yield, which can then be used for a new operation. The acid mother liquors are neutralized with sodium acetate, when 2-[p-aminobenzenesulphonamido]-thiazole of Formula IV is precipitated. On recrystallization from dilute alcohol it melts at 202–203° C.

The reaction in this example can be defined as follows:

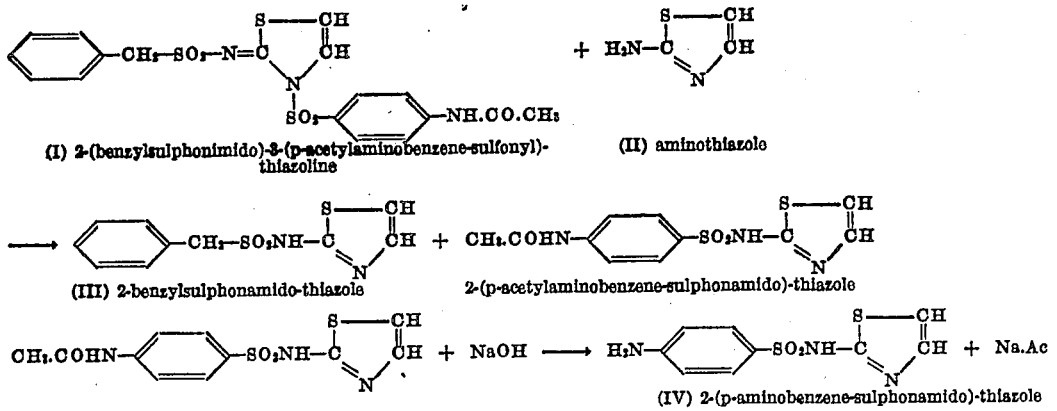

(I) 2-(benzylsulphonimido)-3-(p-acetylaminobenzene-sulfonyl)-thiazoline (III) 2-benzylsulphonamido-thiazole 2-(p-acetylaminobenzene-sulphonamido)-thiazole (IV) 2-(p-aminobenzene-sulphonamido)-thiazole (II) aminothiazole If 2-benzylsulphonamidothiodiazole or 2-ethylsulphonamidothiodiazole is used as starting product instead of 2-benzylsulphonamidothiazole, 2-[p-aminobenzenesulphonamido]-thiazole can be obtained in the same way.

*Example 2*

20 parts of 2-[benzylsulphonimido]-3-[p-acetylaminobenzenesulphonyl]-thiazoline, obtained as described in Example 1, are warmed on a water bath for 4 hours with 5 parts of 2-amino-5-methylthiodiazole in 50 parts of pyridine, and then treated in the same way as described in Example 1. On neutralizing the mother liquors, which are acid to Congo, with sodium acetate, the 2-[p-aminobenzenesulphonamido]-5-methylthiodiazole is obtained in crystalline form. M. Pt. 207–208° C. (from dilute alcohol).

If 2-aminopyrimidine or 6-amino-2:4-dimethylpyrimidine or 2-aminopyridine or 2-aminopyrazine is used instead of 2-amino-5-methylthiodiazole, the following compounds are obtained in an analogous manner: 2-[p-aminobenzenesulphonamido]-pyrimidine (M. Pt. 255°), or 6-[p-aminobenzenesulphonamido]-2:4-dimethylpyrimidine (M. Pt. 237°), or 2-[p-aminobenzenesulphonamido]-pyridine (M. Pt. 191–192°) or 2-[p-aminobenzenesulphonamido]-pyrazine (M. Pt. 255°, with decomposition) respectively.

It is also possible to start from a[benzylsulphonimido]-[p-acetylaminobenzenesulphonyl]-dihydropyrimidine instead of from 2-[benzylsulphonimido]-3-[p-acetylaminobenzenesulphonyl]-thiazoline.

*Example 3*

45 parts 2-[benzylsulphonimido]-3-[p-acetylaminobenzenesulphonyl]-thiazoline (M. Pt. 162° C.) are heated for 1½ hours to 100° C. with 11 parts of 2-amino-4:6-dimethyl-pyrimidine in 60 parts of pyridine. After distilling off the pyridine, the residue is treated for 2 hours on a boiling water bath with 200 parts of 10% caustic soda. 70 parts of concentrated hydrochloric acid are added to the cooled solution until it gives an acid reaction to Congo. The precipitated 2-benzylsulphonamidothiazole is filtered off on a Buchner funnel and 80 parts of 30% caustic soda added to the filtrate. The 2-[p-aminobenzenesulphonamido]-4:6-dimethylpyrimidine is precipitated with acetic acid. After treatment with a little methyl alcohol, it forms needles which melt at 177° C.

*Example 4*

If 2-amino-4-methylpyrimidine is used instead of 2-amino-4:6-dimethylpyrimidine in Example 3, 2-[p-aminobenzenesulphonamido]-4-methylpyrimidine, (M. Pt. 234° C.) is obtained in a similar way. The latter can also be obtained by heating 2-[benzylsulphonimido]-3-[p-nitrobenzenesulphonyl]-thiazoline, melting at 172° C., obtained from 2-benzylsulphonamidothiazole, and p-nitrobenzenesulphonylchloride in the presence of alkali, with 2-amino-4-methyl-pyrimidine in pyridine and treating the product of the reaction with iron and hydrochloric acid.

What we claim is:

1. Compounds of the formula

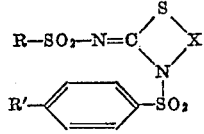

in which R—SO₂— represents a sulphonic acid radical wherein the —SO₂— is directly bonded to a non-aromatic carbon atom, R' a member of the group consisting of amino, acylamino, nitro, azo and halogen, and X a member of the group consisting of $$-\overset{\text{C}}{\underset{\text{C}-}{\|}}\quad \text{and} \quad -\overset{\text{C}}{\underset{\text{N}}{\|}}-$$

2. 2-[benzylsulfonimido]-3-[p-acetylaminobenzenesulphonyl]-thiazolines.

3. 2-[benzylsulphonimido]-3-[p-nitrobenzenesulphonyl]-thiazoline.

4. A process for the manufacture of a sulphonamide, which comprises reacting a heterocyclic amino compound with a compound of the formula

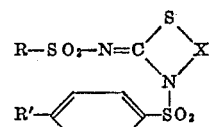

in which R—SO₂— represents a sulphonic acid radical wherein the —SO₂— group is directly bonded to a non-aromatically bound carbon atom, R' is a member of the group consisting of amino, acylamino, nitro, azo and halogen, and X is a member of the group consisting of $$-\overset{\text{C}}{\underset{\text{C}-}{\|}}\quad -\overset{\text{C}}{\underset{\text{N}}{\|}}-$$

5. A process for the manufacture of a sulphonamide, which comprises reacting a heterocyclic amino compound with a compound of the formula

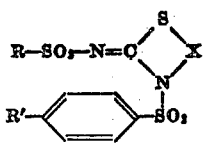

in which R—SO₂— represents a sulphonic acid radical wherein the —SO₂— group is directly bonded to a non-aromatically bound carbon atom, R' is a member of the group consisting of amino, acyclamino, nitro, azo and halogen, and X is a member of the group consisting of

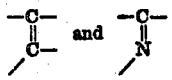

and then converting the substituent R' in the resultant product into an amino group.

6. A process for the manufacture of a sulphonamide, which comprises reacting a heterocyclic amino compound in the presence of pyridine and in the heat with a compound of the formula

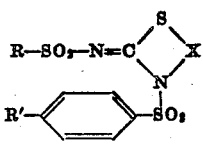

in which R—SO₂— represents a sulphonic acid radical which contains no basic group and no group convertible into a basic group wherein the —SO₂— group is directly bonded to a non-aromatically bound carbon atom, R' is a member of the group consisting of amino, acylamino, nitro, azo and halogen, and X is a member of the group consisting of

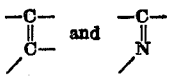

7. A process for the manufacture of a sulphonamide, which comprises reacting a heterocyclic amino compound in the presence of pyridine and in the heat with a compound of the formula

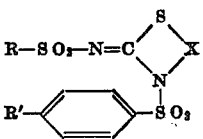

in which R—SO₂— represents a sulphonic acid radical which contains no basic group and no group convertible into a basic group wherein the —SO₂— group is directly bonded to a non-aromatically bound carbon atom, R' is a member of the group consisting of amino, acylamino, nitro, azo and halogen, and X is a member of the group consisting of

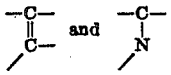

and then converting the substituent R' in the resultant product into an amino group.

8. A process for the manufacture of a sulphonamide, which comprises reacting an aminothiazole in the presence of pyridine and in the heat with a compound of the formula

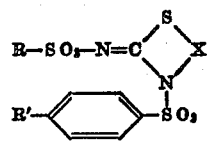

in which R—SO₂— represents a sulphonic acid radical which contains no basic group and no group convertible into a basic group wherein the —SO₂— group is directly bonded to a non-aromatically bound carbon atom, R' is a member of the group consisting of amino, acylamino, nitro, azo and halogen, and X is a member of the group consisting of

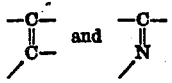

9. A process for the manufacture of a sulphonamide, which comprises reacting an aminothiazole in the presence of pyridine and in the heat with a compound of the formula

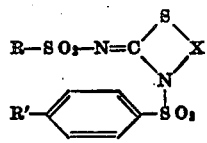

in which R—SO₂— represents a sulphonic acid radical which contains no basic group and no group convertible into a basic group wherein the —SO₂— group is directly bonded to a non-aromatically bound carbon atom, R' is a member of the group consisting of amino, acylamino, nitro, azo and halogen, and X is a member of the group consisting of

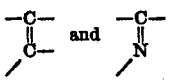

and then converting the substituent R' in the resultant product into an amino group.

10. A process for the manufacture of a sulphonamide, which comprises reacting a heterocyclic amino compound in the presence of pyridine and in the heat with 2-(benzylsulphonimido) - 3-(p-acylaminobenzenesulphonyl)-thiazoline, and treating the resultant product with a hydrolyzing agent.

11. A process for the manufacture, of a sulphonamide, which comprises reacting an aminothiazole in the presence of pyridine and in the heat with 2-(benzylsulphonimido)-3-(p-acylaminobenzenesulphonyl)-thiazoline, and treating the resultant product with a hydrolyzing agent.

12. A process for the manufacture of a sulphonamide, which comprises reacting a heterocyclic amino compound in the presence of pyridine and in the heat with 2-(benzylsulphonimido) - 3 - (nitrobenzenesulphonyl)-thiazoline, and treating the resultant product with a hydrolyzing agent.

13. A process for the manufacture of a sulphonamide, which comprises reacting an aminopyrimidine in the presence of pyridine and in the heat with 2-(benzylsulphonimido)-3-(p-nitrobenzylsulphonyl)-thiazoline, and treating the resultant product with a hydrolyzing agent.

MAX HARTMANN.
FRANZ CUENI.
JEAN DRUEY.
HARALD von MEYENBURG.